(12) United States Patent
Liu et al.

(10) Patent No.: US 10,085,184 B2
(45) Date of Patent: Sep. 25, 2018

(54) METHODS AND DEVICES FOR TRIGGERING MOBILITY REFERENCE SIGNALING

(71) Applicant: Telefonaktiebolaget LM Ericsson (publ), Stockholm (SE)

(72) Inventors: Jinhua Liu, Beijing (CN); Qingyu Miao, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/527,008

(22) PCT Filed: Dec. 7, 2015

(86) PCT No.: PCT/SE2015/051312
§ 371 (c)(1),
(2) Date: May 15, 2017

(87) PCT Pub. No.: WO2017/099639
PCT Pub. Date: Jun. 15, 2017

(65) Prior Publication Data
US 2017/0374587 A1 Dec. 28, 2017

(51) Int. Cl.
*H04W 36/00* (2009.01)
*H04W 8/00* (2009.01)
*H04W 74/08* (2009.01)

(52) U.S. Cl.
CPC ....... *H04W 36/0083* (2013.01); *H04W 8/005* (2013.01); *H04W 74/0833* (2013.01); *H04W 74/0891* (2013.01)

(58) Field of Classification Search
CPC ......... H04W 52/0206; H04W 36/0083; H04W 72/1278; H04W 24/10; H04W 76/046;
(Continued)

(56) References Cited

U.S. PATENT DOCUMENTS

2009/0264132 A1* 10/2009 Tajima ................ H04W 76/046
455/436
2013/0039195 A1* 2/2013 Weng .................... H04W 48/20
370/252
(Continued)

FOREIGN PATENT DOCUMENTS

WO 2013020209 A1 2/2013

OTHER PUBLICATIONS

International Search Report and Written Opinion for International Application No. PCT/SE2015/051312, dated Aug. 31, 2016, 13 pages.
(Continued)

*Primary Examiner* — Nizar Sivji
(74) *Attorney, Agent, or Firm* — NDWE LLP (57) ABSTRACT

A method performed in a communication device for triggering mobility reference signaling in a communications system. The method comprises determining a need for a handover, and transmitting, to at least one candidate access point, an indication to transmit a mobility reference signal, the mobility reference signal being used for performing measurements for handover. A related communication device, method in a network node, network node, computer programs and computer program products are also disclosed.

27 Claims, 6 Drawing Sheets (58) Field of Classification Search
CPC ............. H04W 36/00; H04W 36/0088; H04W 36/0094; H04W 8/005; H04W 74/0833; H04W 74/0891; H04L 5/0085; H04B 7/0632

See application file for complete search history.

(56) References Cited

U.S. PATENT DOCUMENTS

| | | | |
|---|---|---|---|
| 2014/0274079 A1 | 9/2014 | Li et al. | |
| 2014/0301301 A1 | 10/2014 | Cheng et al. | |
| 2014/0314000 A1* | 10/2014 | Liu | H04W 72/042 370/329 |
| 2014/0334320 A1* | 11/2014 | Liu | H04W 52/242 370/252 |
| 2015/0139001 A1 | 5/2015 | Xue et al. | |

OTHER PUBLICATIONS

International Preliminary Report on Patentability for International Application No. PCT/SE2015/051312, dated Feb. 12, 2018, 18 pages.

\* cited by examiner

METHODS AND DEVICES FOR TRIGGERING MOBILITY REFERENCE SIGNALING

CROSS-REFERENCE TO RELATED APPLICATIONS

This application is a National stage of International Application No. PCT/SE2015/051312, filed Dec. 7, 2015, which is hereby incorporated by reference.

TECHNICAL FIELD

The technology disclosed herein relates generally to the field of mobility in communications systems and in particular to methods, communication device, network node, computer programs and computer program products for triggering mobility reference signaling in communications systems.

BACKGROUND

The fifth generation (5G) wireless system will comprise Long Term Evolution (LTE) together with a new radio-access technology, which is denoted by "NX" (next generation) in the following. LTE will focus on backwards-compatible enhancements in existing spectrum, while NX will focus on new spectrum, i.e. spectrum where LTE is not deployed.

NX will run over even higher frequencies than current systems due to lack of low frequency resources and the coverage provided by radio access points (APs) will be smaller than the coverage provided by existing nodes, such as 3G Node B and 4G eNodeB. With small AP coverage, comprising e.g. beam sectors, the mobility robustness is of critical importance in order to keep the user satisfaction high. A user traveling fast between different small coverage areas, e.g. moving between different beams, should still obtain uninterrupted service in order to maintain the user satisfaction. This requires careful consideration in view of mobility issues, such as handover.

SUMMARY

An objective of the present teachings is to address the above described situation and improve on procedures currently being suggested.

The objective is according to an aspect achieved by a method performed in a communication device for triggering mobility reference signaling in a communications system. The method comprises determining a need for a handover, and transmitting, to at least one candidate access point, an indication to transmit a mobility reference signal, the mobility reference signal being used for performing measurements for handover.

The method provides several advantages. For instance, the delay for mobility reference signal measurement procedure can be largely reduced. This reduction in delay is provided by the method letting communication devices initiate the triggering of the mobility reference signaling from the selected candidate access point instead of the serving access point forwarding the mobility reference signal request to the candidate access point. The signaling overhead may thereby clearly be reduced owing to fewer messages being transmitted compared to forwarding the mobility reference signal request message via the serving access point. Further, the handover failure rate may be reduced by means of the method, and the user satisfaction may thereby be kept or even increased.

The objective is according to an aspect achieved by a computer program for a communication device for triggering mobility reference signaling. The computer program comprises computer program code, which, when executed on at least one processor on the communication device causes the communication device to perform the method as above.

The objective is according to an aspect achieved by a computer program product comprising a computer program as above and a computer readable means on which the computer program is stored.

The objective is according to an aspect achieved by a communication device for triggering mobility reference signaling in a communications system. The communication device is configured to determine a need for a handover, and to transmit, to at least one candidate access point, an indication to transmit a mobility reference signal, the mobility reference signal being used for performing measurements for handover.

The objective is according to an aspect achieved by a method performed in a network node for mobility reference signaling. The method comprises transmitting a discovery reference signal; detecting, in a transmission from a communication device, an indication to transmit a mobility reference signal; and transmitting, in response to the detection, a mobility reference signal.

The objective is according to an aspect achieved by a computer program for a network node for mobility reference signaling. The computer program comprises computer program code, which, when executed on at least one processor on the network node causes the network node to perform the method as above.

The objective is according to an aspect achieved by a computer program product comprising a computer program as above and a computer readable means on which the computer program is stored.

The objective is according to an aspect achieved by a network node for mobility reference signaling. The network node is configured to: transmit a discovery reference signal; detect, in a transmission from a communication device, an indication to transmit a mobility reference signal; and transmit, in response to the detection, a mobility reference signal.

Further features and advantages of the various embodiments according to the present teachings will become clear upon reading the following description and the accompanying drawings.

DETAILED DESCRIPTION

In the following description, for purposes of explanation and not limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail. Same reference numerals refer to same or similar elements throughout the description.

In NX/5G, there is no concept of cell anymore. Instead communication devices, in the following exemplified by user equipment (UE), move from beam to beam. In this regards, the inventors of the present invention, in its various embodiments, have identified some shortcomings of a currently suggested procedure, which procedure is described next with reference to FIG. 1.

Figure 1:
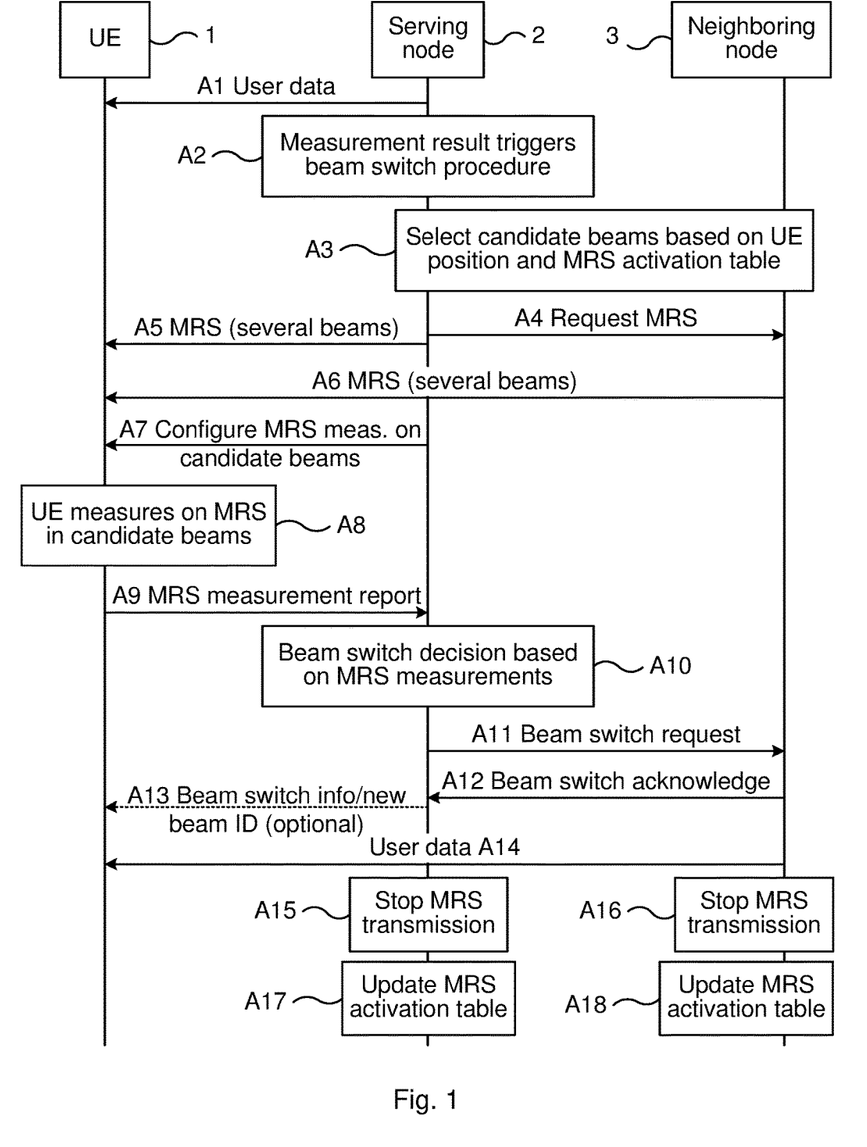
FIG. 1 is a signaling scheme for a beam switching procedure in next generation wireless systems.

FIG. 1 illustrates an active mode mobility procedure for NX according to the current view. A UE 1 receiving user data (arrow A1) by a serving beam transmitted from its serving node 2 measures quality of the serving beam and reports the measurement results to the serving node 2. The measurement results may trigger a beam switch preparation procedure (box A2) in the serving node 2, upon which the serving node 2 selects candidate beams based on the position of the UE and an MRS activation table (box A3). The serving node 2 starts transmitting MRS (A5) and also requests (arrow A4) a neighboring node 3 to start transmitting MRS, which it does (arrow A6). The serving node 2 then configures the UE 1 with MRS measurements on candidate beams (arrow A7), which may be provided by the serving node 2 as well as from neighboring nodes 3. This configuration can be made in order to reduce blind detection attempts, i.e. the network informs the UE 1 about which MRSs to measure. The UE 1 starts measuring (box A8) on the mobility reference signals (MRS) according to the received configuration, and sends (arrow A9) an MRS measurement report to the serving node 2. Based on the MRS measurement reports received from the UE 1, the serving node 2 knows the best beam and makes (box A10) a beam switch decision. If the decision is that a beam from the neighboring node 3 is most suitable for the UE 1, then the serving node 2 sends (arrow A11) a beam switch request to the neighboring node 3, which the neighboring node 3 acknowledges (arrow A12). The serving node 2 informs (arrow A13) the UE 1 about the beam switch, optionally providing the UE 1 with a beam identification of the new beam. The neighboring node 3 is then the serving node and starts transmitting (arrow A14) user data on the new beam. At boxes A15, A16 both nodes 2, 3 stop the MRS transmissions and update (boxes A17, A18) their respective MRS activation tables.

In order to reduce signaling overhead, the MRS is not always transmitted unlike, for instance, cell specific reference signals (CRS) in LTE systems. Instead MRS is activated when it is necessary (as indicated by arrow A4 in FIG. 1). When several Access Nodes (AN) are involved in a mobility measurement, as described with reference to FIG. 1, each involved AN should send the specific MRSs at the request of the current serving AN 2 of the UE via inter-AN signaling (e.g. via a wired connection).

The inventors of the present invention, in its various embodiments, have identified some shortcomings of this suggested procedure. When the MRS is transmitted only from the serving AN, it may not be problematic as no extra-signaling is needed besides the measurement report from the UE 1 to the serving AP 2. However, when the MRS is transmitted from another candidate AN 3 than the serving AN 2, there are multiple signaling messages before the selected candidate AN 3 starts to transmit the MRS signal: the measurement report from the UE to the serving AN (arrow A9), the MRS request message from the serving AN 2 to the candidate AN 3 (arrow A4), the response message to the request from the candidate AN 3 to the serving AN 2 (arrow A12), the MRS configuration message from the serving AN 2 to the UE 1 (arrow A7).

Furthermore, certain margin should be considered due to the extra delay for occasional retransmissions of the messages. For an ideal backhaul, the delay of such procedure could be acceptable even though there is signaling overhead. However, for non-ideal backhaul cases, such frequent message transmissions over the inter-AN backhaul would result in unacceptable delay for mobility procedure and increase the radio connection failure probability.

In order to improve on the above situation, the present teachings provide, in various embodiments, methods to allow a UE to trigger the MRS transmission by a selected candidate access point (AP) directly in order to thereby shorten the delay for measurement and reduce the overhead for signaling to request MRS transmission.

Figure 2:
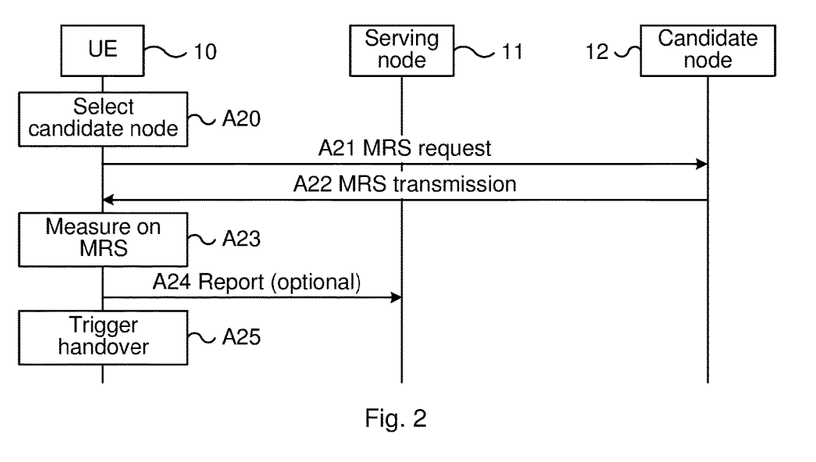
FIG. 2 is a signaling scheme illustrating a procedure for triggering mobility reference signaling.

FIG. 2 is a signaling scheme illustrating a procedure for triggering mobility reference signaling according to the present teachings. Briefly, the UE 10 may autonomously trigger MRS transmissions from selected candidate APs 12 via signaling from the UE 10 to the selected candidate APs 12 over the air interface according to pre-configurations and/or according to predefined rules. If the UE 10 determines that there is a need for a handover, e.g. since its current reception quality is deteriorating, then the UE 10 may itself trigger the MRS transmission.

At box A20, the UE 10 therefore selects at least one candidate node to which an MRS request is to be sent. This may, as indicated above, be triggered by the UE 10 determining a need for a handover based on having measured the radio quality of the currently received beam to be below a set threshold, i.e. the currently serving beam, provided by the serving node 11, is too weak. Upon determining this, the UE 10 may autonomously send (arrow A21) an MRS request to a candidate node 12. In other embodiments the UE 10 may instead send the MRS request blindly, i.e. not explicitly indicating one or more candidate nodes 12.

The at least one candidate node 12 then starts transmitting (arrow A22) the requested MRS. The MRS request may be implemented in different ways, as will be described later e.g. with reference to FIGS. 5 and 6, but in essence some type of indication is sent to the at least one candidate node 12 with the effect that the candidate node 12, in response, transmits the MRS. The UE 10 may measure on the MRS for determining if a handover is to be done.

At box A23, the UE 10 measures on the received MRS. The UE 10 may optionally send (arrow A24) a measurement report on the selection to its currently serving AP.

At box 25, the UE 10 may determine on a handover, e.g. if it is moving at a high speed and is unable to report to the serving node 11. In other embodiments, the UE 10 have reported (arrow A24) the MRS measurement results to the serving node 11 and the serving node 11 decides if a handover should be performed.

It is noted that the handover may be a handover from a first beam to a second beam, also denoted beam switch. The first and second beams may both be provided by the currently serving node 11, or the first beam may be from the currently serving node 11 while the second beam is from the candidate node 12. In one scenario thus, the UE 10 determines that a handover is needed, e.g. since its' currently serving beam is too weak. When the UE 10 receives the MRS from the candidate node 12, it determines that a beam from its currently serving node 11 is worse (e.g. as determined by some reception parameter) than a beam from the candidate node 12, and hence a handover from a first beam of the currently serving node 11 to a beam of the second candidate node 12 is done. In another scenario, the handover is from a first beam provided by the serving node 11 to a second beam provided by the serving node 11.

Figure 3:
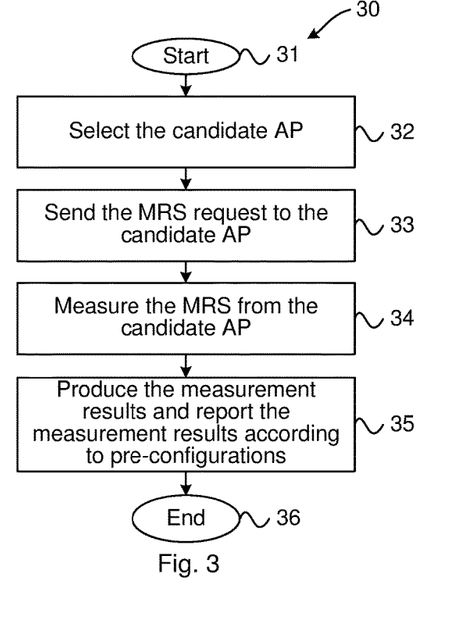
FIG. 3 is a flow chart over steps of a method in a communication device.

FIG. 3 is a flow chart over steps of a method in a communication device, in the following exemplified by a UE 10. The flow 30 starts (box 31) and in box 32 the UE 10 selects one or more candidate APs 12 to which the UE 10 should send an MRS request. This selection may, as described with reference to FIG. 2, be triggered based on radio quality measurements. In other embodiments, the selection is made based on instructions from the serving node AP 11. In still other embodiments, the selection is based both on instruction from the serving AP 11 and radio quality measurements.

The UE 10 may for instance be receiving AP discovery signals, e.g. reference signals, on a beam from a neighboring AP 12 at a higher quality than from a currently used beam provided by a serving AP 11. If the discovery signals are strong enough, then this neighboring AP may be selected as a node to which an MRS request should be sent. In this regard it may be noted that a beam switch (handover) may be from a first beam of the serving AP 11 to a second beam of the serving AP 11. The UE 10 may alternatively be instructed by the serving AP 11 about suitable candidate APs from which the UE 10 should obtain MRS, i.e. to which the UE 10 should send MRS requests.

In box 33, the UE 10 sends the MRS requests to the selected candidate APs. The UE may be configured to itself determine to trigger a MRS transmission from the candidate AP 12. This triggering can be made by sending a MRS request message (e.g. preamble) to the selected candidate AP 12 via an air interface. The candidate AP 12 can be selected by the UE 10, as described above, or the UE 10 may blindly send the MRS request message to all the APs. Under certain conditions the UE 10 cannot differentiate the neighboring APs via AP discovery signal, e.g. when a set of APs share one common node ID, and the UE 10 may then just blindly send the MRS request without explicitly indicating that the MRS is for a specified AP.

Next, in box 34, the UE 10 measures the MRS sent by the at least one selected candidate AP 12. The UE 10 may start to measure the MRS according to a predefined timing between the MRS request transmission and the subsequent MRS transmission from the at least one selected AP 12.

In box 35, the UE 10 generates measurement results. The UE 10 may measure radio characteristics such as, for instance, received power of reference signal, received power on a frequency currently used, received quality of reference signal, etc.

The UE 10 may also optionally report the measurement results e.g. according to pre-configurations of the UE 10. The UE 10 may, for instance, send a measurement report to its serving AP 11 and allow the serving AP 11 to determine the handover. In other embodiments, the UE 10 may itself determine to perform the handover based on the measurement. The latter case, i.e. the UE autonomously performing the handover may, for instance, occur if the UE 10 is moving too fast to be able to report to the serving AP 11. The current connection is then dropped and a new connection is initiated with the selected candidate AP 12. The selected candidate AP 12, i.e. the new serving AP 12, may inform the previously serving AP 11 about the handover for instance by the UE 10 having informed the new serving AP 12 about the identity of the previously serving AP 11. This may be beneficial for instance for enabling the previously serving AP to quickly release any bearers or other resources and forward the buffered data for the UE 10 to the new serving AP 12. The flow then ends in box 36.

Figure 4:
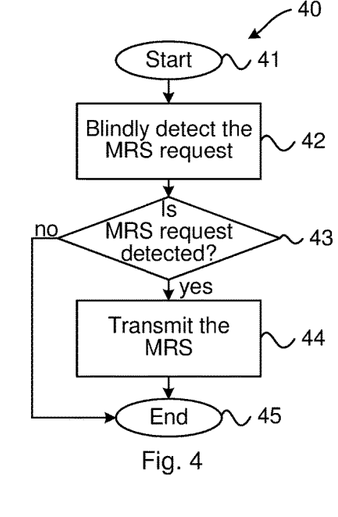
FIG. 4 is a flow chart over steps of a method in a network node.

FIG. 4 is a flow chart over steps of a method in a network device or network node, for instance in an access point. The flow 40 starts in box 41 and in box 42 the network device, in the following exemplified by an eNodeB, blindly detects the MRS request. In other embodiments, the eNodeB have sent discovery reference signals, which the UE receives and which enables the UE to explicitly indicate that the MRS request is for this particular eNodeB. In decision box 43, the eNodeB starts the MRS transmission when the MRS request is detected. If no MRS request is received, flow ends in box 45. If, in box 43, a MRS request is detected flow continues to box 44 and the eNodeB transmits the requested MRS, after which the flow ends in box 45.

As mentioned earlier (e.g. with reference to FIG. 2) the UE 10 may use predefined rules for triggering an MRS request. Examples of such predefined rules for when the UE 10 should transmit the MRS request comprise:

The radio link quality of the currently serving AP 11 is lower than a first preconfigured absolute threshold;

The AP discovery signal quality of the currently serving AP 11 is lower than a second absolute threshold;

The difference between the AP discovery signal quality of the currently serving AP 11 and that of the candidate AP 12 is smaller than a third threshold.

The above examples may also be used by the UE 10 for determining a need for handover.

The condition for triggering the MRS request may take into account the speed with which the UE moves: for a UE moving with higher speed, the MRS request can be triggered according to more aggressive conditions (e.g. with higher first, second and third thresholds). The UE may determine its speed in different ways, known as such. For instance, the UE may be configured with a number of mobility states corresponding to a respective range of speeds. The UE may then select mobility state according to a counted number of cell reselections or beam switches performed within a certain period of time.

If implementing pre-configurations, the pre-configurations may be sent to the UE via Radio Resource Control (RRC) signaling at the radio connection setup for the UE, or be broadcasted via system information message, media access control (MAC) layer messages or physical layer messages. Such pre-configurations may comprise thresholds, whether or not the UE is enabled or disabled to autonomously perform a handover etc.

Under certain conditions the UE cannot differentiate the AP via AP discovery signal, e.g. because a set of APs may share a common node ID. The UE may then blindly send the MRS request without explicitly indicating for which AP the MRS is. Any AP which detects the MRS request may then send the requested MRS.

In some embodiments, if the UE 10 comprises beamforming means, the UE may point a transmission (TX) beam for the MRS request transmission in a desired direction. It may select beamforming configuration settings e.g. based on reciprocity of the AP discovery signal beam.

In some embodiments, the MRS triggering request may be sent to the selected candidate AP using contention based transmission. As an example on this, the MRS triggering request may share the same preamble sequence pool with the Physical Random Access channel (PRACH) and use the same time-frequency window as for PRACH transmission. In LTE, the PRACH carries a random access preamble. The UE generates a preamble sequence (or "signature") based on a preamble index that is broadcast in the network. Typically, there are 64 preamble sequences available in each cell which the UE can select among.

Figure 5:
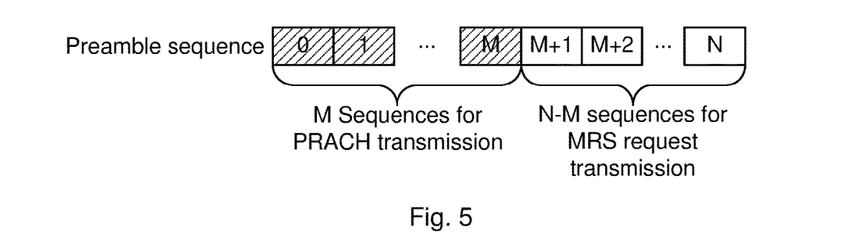
FIG. 5 illustrates a preamble sequence allocation for transmission of mobility reference signal request.

FIG. 5 illustrates a preamble sequence allocation for transmission of mobility reference signal request. In some embodiments, a subset of the preamble sequences used for PRACH can be reallocated for MRS triggering request transmission. In FIG. 5, the preamble sequences allocated for PRACH comprises N+1 sequences; preamble sequence 0, preamble sequence 1, . . . , preamble sequence N. A subset of these preamble sequences may be reallocated for the MRS request transmission. For instance, of the N+1 preamble sequences, a subset comprising preamble sequences M+1, M+2, . . . , N, may be reallocated for the MRS request transmissions, hence leaving preamble sequences 0, 1, . . . , M for the PRACH transmissions for random access. It is noted that in such embodiments, the preamble sequence pool may be partitioned in any desired manner.

Figure 6:
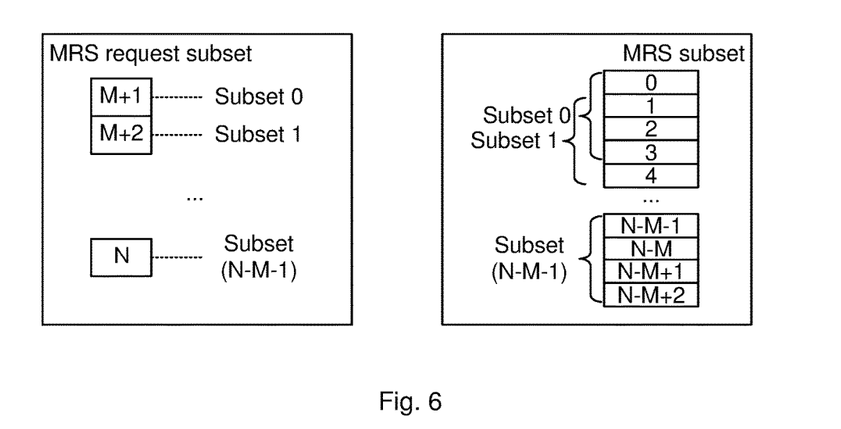
FIG. 6 illustrates an exemplary association between mobility reference signal request sequence and mobility reference signal subset.

FIG. 6 illustrates an exemplary association between mobility reference signal request sequences and mobility reference signal subset. In some embodiments, a number of subsets of MRSs may be predefined or preconfigured in a wireless communications system. An association or mapping between a particular MRS request sequence (leftmost box of FIG. 6) and a MRS subset (rightmost box of FIG. 6) can also be predefined or pre-configured. By means of such pre-configuration, the UE can determine which MRS is/are to be measured when using a certain MRS request sequence. When a certain MRS request sequence is detected by the selected candidate AP, the AP may determine the MRS subset according to the association or mapping. For instance, the UE may randomly select a MRS request sequence, e.g. a PRACH preamble sequence reserved for MRS requests (as described with reference to FIG. 5), and send it to one or more APs. The PRACH preamble sequence may itself implicitly indicate which MRS subset should be sent. The APs receiving the MRS request may then use the preconfigured mapping and send the MRSs of the MRS subset corresponding to the received MRS request.

FIG. 6 exemplifies this: the leftmost box of FIG. 6 associates MRS request sequences according to: M+1 is associated with Subset 0, M+2 with Subset 1, . . . , and so on until MRS sequence N, which is associated with Subset N−M−1. The rightmost box of FIG. 6 illustrates the MRS subsets, each subset comprising, in the illustrated example, four MRSs.

The mapping between the MRS request sequence (e.g. a reserved PRACH preamble sequence as mentioned earlier) and the corresponding subset of MRSs is preferably preconfigured for ease of implementation. However, in other embodiments, there is no such pre-configuration. The UE may then include additional information, e.g. an index, in the MRS request sequence indicating which subset of MRSs should be sent. In such embodiments, the UE may then determine the index corresponding to a subset of MRSs to measure on, transmit the determined index to the candidate AP (or APs) and then start measuring on the requested subset of MRSs.

Figure 7:
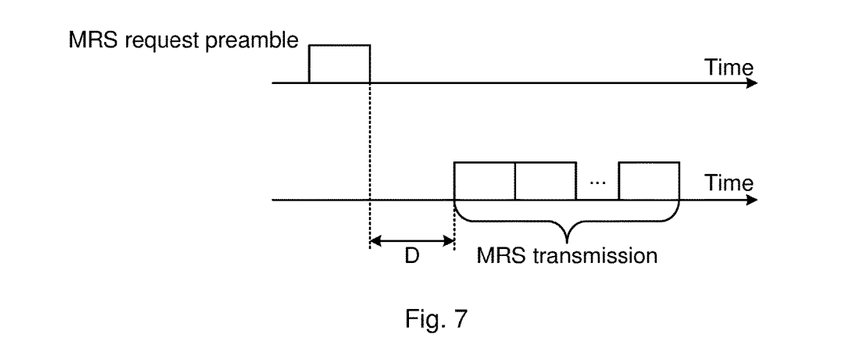
FIG. 7 illustrates an exemplary timing association between mobility reference signal request and mobility reference signal transmission.

FIG. 7 illustrates an exemplary timing association between a MRS request and a MRS transmission. In some embodiments, a timing association between the MRS request transmission sent by the UE and the subsequent MRS transmission by the AP can be predefined or pre-configured so that the UE can blindly monitor and measure the MRS transmission. FIG. 7 shows an example on such timing association, or delay D between the UE sending the MRS request transmission and the MRS being transmitted from the selected candidate AP. D may be a fixed delay interval between the transmission of MRS request and the transmission of the MRS and enables the UE to know when to start measuring on the signal. Further, such timing association enables the UE to know when a retransmission of the MRS should be made. For instance, if the UE has not received the requested MRS within a set period of time, e.g. the delay D, then it should perform a retransmission. Different subsets of MRS sequences can be either partially overlapped or fully isolated. By jointly using the timing for MRS transmission and the partial difference between MRS set, different UEs may differentiate their MRS sequence in measurement. When there are not so many MRS sequences available, such MRS grouping method may help the UE to distinguish the desired MRS to be measured.

In still further embodiments, the UE may determine if a MRS request is successful or not. For instance, an acknowledge signal may be transmitted to the UE by the selected candidate AP having detected the MRS request. The acknowledge signal may be transmitted together with, or prior to, a first of at least one MRS beams to the UE. The UE measures the MRS and monitors the acknowledge signal. In some embodiments, the measurement results are adopted only if the acknowledge signal is detected. For example, the UE may determine if the MRS measurement results should be used or not or simply based on not having received it all within a set period of time (e.g. the delay D, described with reference to FIG. 7). If the MRS measurement results are lower (e.g. a pre-configured offset lower) than recently determined measurement results of an AP discovery signal, then the measurement results may be discarded and new MRS request be triggered. Otherwise the MRS measurement results may be adopted.

In still another embodiment, the acknowledge signal may be sent to the UE before the MRS transmission. The UE starts to monitor and measure the MRS only when the acknowledge signal is detected.

If it is determined that no MRS was received, the UE may take action. The UE may for instance send another MRS request and increase its transmission power for this MRS request, or use a broader beam when transmitting the MRS request or send several beams, or any combination thereof. Such failure to receive the MRS may be determined in different ways, for instance (as described above) by not having received any MRS within a certain period of time.

In some embodiments, the serving AP may conditionally instruct the UE to send the MRS request. In this case, the UE just sends the MRS request according to the instruction from the serving AP. When there is no good backhaul between the serving AP and the candidate AP (e.g. backhaul congestion, backhaul deterioration due to serious interference), the serving AP may send a message to the UE instructing the UE to send the MRS request to the selected candidate AP or an indicated candidate AP.

In some embodiments, the feature of the UE triggering a MRS transmission from candidate APs may be configured by the communications system. For instance, if the backhaul between the serving AP and the candidate AP is good enough, this feature can be disabled and a procedure may be used wherein the MRS requests are sent by the serving access point to the candidate access point (e.g. as described with reference to FIG. 1). The feature of the UE triggering the MRS transmission may thus be enabled and disabled by the communications system.

The various features and embodiments that have been described can be combined in many different ways, examples of which are given in the following, with reference first to FIG. 8.

Figure 8:
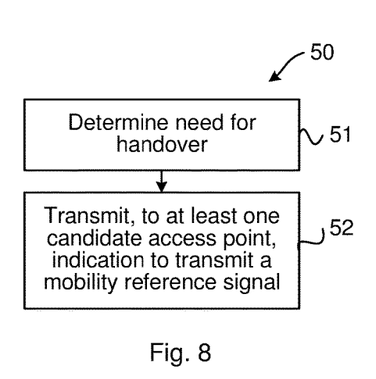
FIG. 8 illustrates a method in communication device in accordance with the present teachings.

FIG. 8 illustrates a method in communication device in accordance with the present teachings. A method 50 is provided, which may be performed in a communication device 10 for triggering mobility reference signaling in a communications system 90. The method 50 comprises determining 51 a need for a handover.

The method 50 comprises transmitting 52, to at least one candidate access point 12, an indication to transmit a mobility reference signal, the mobility reference signal being used for performing measurements for handover. The handover may, as have been described earlier (e.g. in relation to FIG. 2), be from one beam to another beam, wherein the beams (which may be one or more) may be provided from the currently serving access point as well as from at least one candidate access point.

The method 50 provides several advantages. By enabling the communication device 10 to initiate triggering of mobility reference signals from candidate access points a faster measuring on suitability of candidate access points can be effectuated. This is particularly important when the access point coverage area, e.g. comprising beams formed specifically for a user device, are small and handover has to be effectuated rapidly in order to not drop the connection. The communication device 10 may also autonomously decide that a handover to another access point should be made. User satisfaction can thereby be maintained even when the coverage areas provided by access points get smaller.

The communication device 10 may determine a need for a handover for instance by determining the beam quality of a beam provided by the currently serving access point. As a particular example of such determination, the communication device 10 determines that the radio link quality of the beam provided by its currently serving access point 11 is lower than a first preconfigured absolute threshold (further examples were described e.g. in relation to FIG. 4). When having determined that there is need for handover, the communication device 10 sends the mobility reference signal request to one or more candidate access points.

As have been noted before, a handover may be a beam switch and/or a change of serving access point. A beam switch may for instance be from a first beam to a second beam, wherein both beams are provided by the serving access point. In other instances the beam switch may be from a first beam provided by the serving access point to a second beam provided by a candidate access point.

In an embodiment, the indication comprises a preamble sequence, the preamble sequence being selected from a set of preamble sequences.

In a variation of the above embodiment, the set of preamble sequences comprises a subset of preamble sequences allocated for physical random access channel, PRACH. This use of PRACH preamble sequences that are reserved for the mobility reference signal request (described e.g. in relation to FIG. 5) is easily implemented in existing and future systems, and may be combined with any of the embodiments described herein.

In some embodiments, the method 50 comprises transmitting the preamble sequence on a physical random access channel, PRACH. Various other channels are also possible.

In some embodiments, the method 50 comprises:
  determining an index corresponding to a subset of mobility reference signals to measure on,
  transmitting, to the candidate access point 12, the determined index in the indication, and
  measuring on the subset of mobility reference signals transmitted by the candidate access point 12. This embodiment may, as described with reference to FIGS. 5 and 6, be implemented as a preconfigured mapping between a particular indication to transmit a mobility reference signal (e.g. a reserved PRACH preamble sequence) and a specific set of mobility reference signals.

In various embodiments, the set of preamble sequences comprises one of: random access sequences, uplink sounding reference signal sequences and uplink synchronization signal sequences.

In various embodiments, the transmitting 52 comprises transmitting the indication in a beam directed towards the candidate access point 12.

In a variation of the above embodiment, beamforming of the beam is based on reciprocity of a beamformed discovery reference signal (e.g. cell-specific reference signal or system signature index) received from the candidate access point 12.

In various embodiments, the transmitting 52 comprises blindly transmitting the indication in multiple directions.

Figure 9:
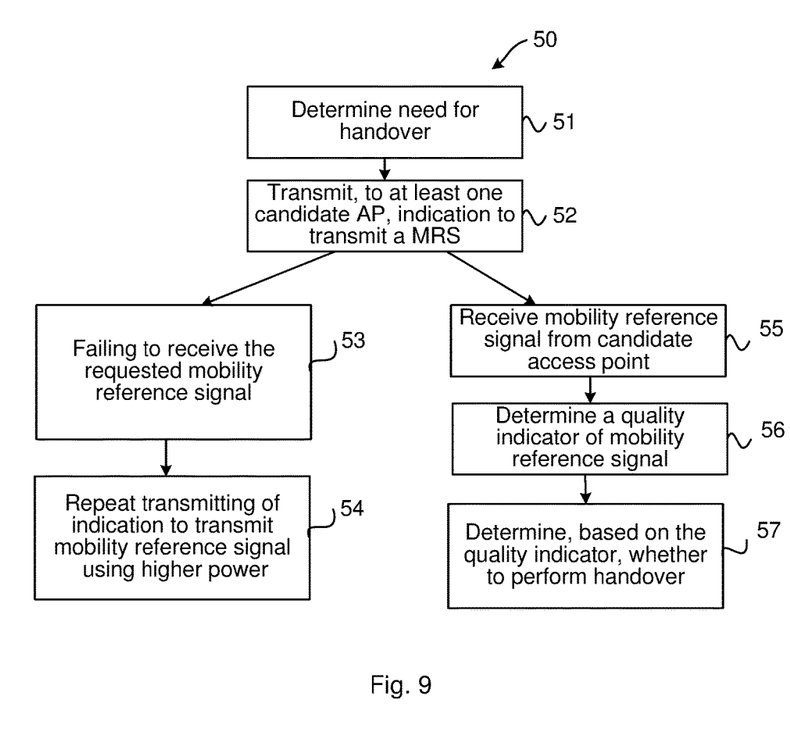
FIG. 9 illustrates various embodiments of a method in communication device in accordance with the present teachings.

FIG. 9 illustrates various embodiments of the method 50 in communication device in accordance with the present teachings. It is noted that steps 53, 54, 55, 56, 57 describe embodiments of the method, and that these steps hence are optional.

Steps 51 and 52 have been described and are not repeated here. In various embodiments, the method 50 comprises determining 53 failure to receive the mobility reference signal and repeating 54 the transmitting 52 of the indication using a higher power. Such determining 53 may for instance be based on the communication device 10 not receiving any mobility reference signal from the candidate access point within a certain period of time. It is noted that it is not necessarily the same indication that is retransmitted as was initially transmitted. For instance, if first transmitting a first preamble sequence as the indication, then when determining that the request has to be repeated, a second preamble sequence may be used as the indication.

In various embodiments, the method 50 comprises:
  receiving 55 the mobility reference signal from the candidate access point 12,
  determining 56 a quality indicator of the mobility reference signal, and determining 57, based on the quality indicator, whether to perform a handover. The communication device 10 may autonomously determine to perform the handover based on the measurement and determined quality indicator. This may, for instance, occur if the communication device 10 is moving too fast to be able to report to the currently serving access point 11. The current connection may then be dropped and a new connection initiated with the selected candidate access point 12. In one embodiment, the communication device 10 determines that there is a need for a handover. This determination may be done in different ways as has been exemplified. Having determined this, the communication device transmits the indication (e.g. PRACH preamble sequence) to transmit a mobility reference signal to at least one candidate access point 12. When receiving the mobility reference signal, the communication device 10 determines a quality indicator thereof. The mobility reference signal may, for instance, have been sent in a beam and the communication device 10 may then measure the beam quality thereof. The communication device 10 may then determine whether or not to perform a handover to another beam and/or to the candidate access point 12. The determination may comprise comparing the determined quality indicator for the mobility reference signal with a corresponding quality indicator for it currently serving link, which may comprise a beam from its currently serving access point 11.

In various embodiments, the determining 51 a need for a mobility reference signal is based on quality of a radio link between the communication device 10 and the currently serving access point 11.

The method 50 may also comprise reporting, to a serving access point 11, about measuring of a quality indicator of the mobility reference signal. As have been described earlier, the reporting may but need not, or sometimes cannot (e.g. if the communication device 10 is moving too fast), be done.

Figure 10:
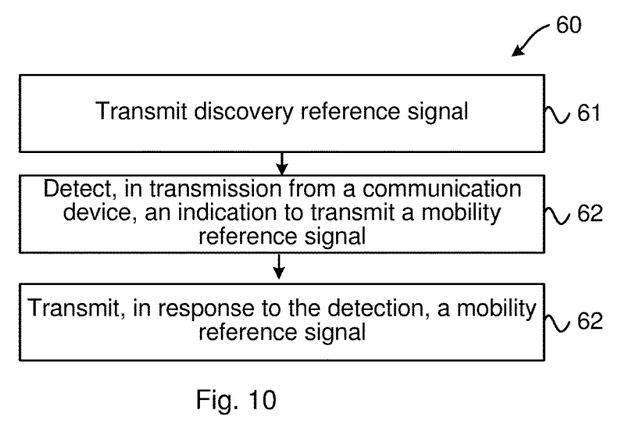
FIG. 10 illustrates a method in a network node in accordance with the present teachings.

FIG. 10 illustrates a method in a network node in accordance with the present teachings. A method 60 is provided, which may be performed in a network node 11, 12 for mobility reference signaling. The method 60 comprises transmitting 61 a discovery reference signal. The discovery reference signal may for instance be a reference signal, such as a cell-specific signal or system signature index. The discovery reference signal enables communication devices 10 to discover the network node 11, 12 and thereby to send a request for mobility reference signals to the network node 11, 12. However, as have been described, the communication device 10 may alternatively send the mobility reference signals blindly, i.e. without having identified the network node 11, 12.

The method 60 comprises detecting 62, in a transmission from a communication device 10, an indication to transmit a mobility reference signal. The indication may, as have been described, comprise a PRACH preamble sequence reserved for the purpose of requesting mobility reference signals. The detecting 62 may be performed in known manner.

The method 60 comprises transmitting 63, in response to the detection, a mobility reference signal.

In an embodiment, the indication comprises an index corresponding to a subset of mobility reference signals, and the method 60 comprises, upon detecting 62 the index, determining a subset of mobility reference signals corresponding to the detected index, and transmitting the determined subset of mobility reference signals. For implementing this embodiment, the network node 11, 12 may use a mapping between the index and the corresponding subset of mobility reference signals (as have been described e.g. with reference to FIGS. 5 and 6).

In some embodiments, the transmitting 62 comprises transmitting the mobility reference signal using user-specific beamforming.

Figure 11:
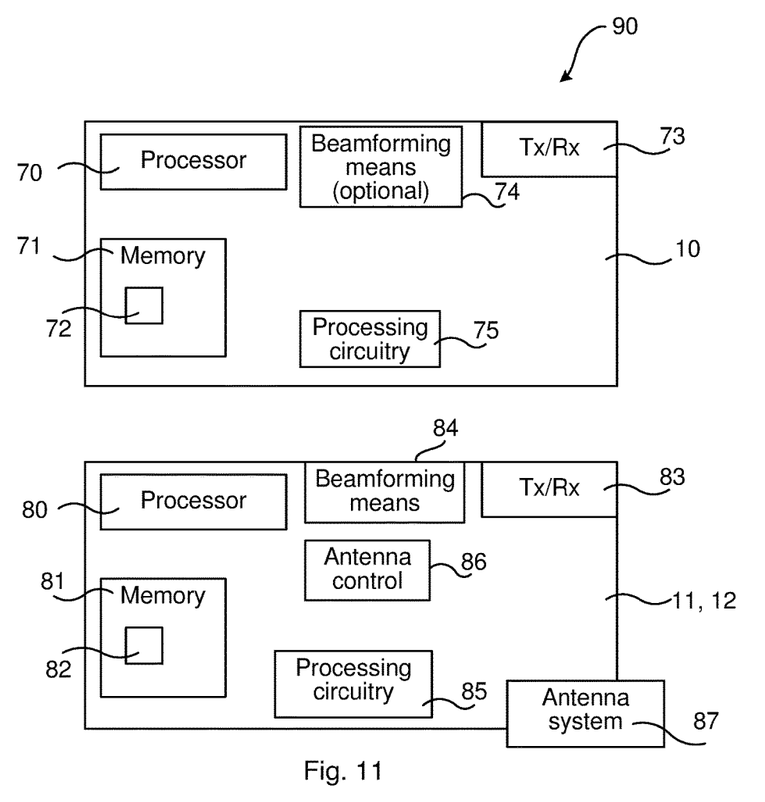
FIG. 11 illustrates schematically a communications system and means for implementing embodiments in accordance with the present teachings.

FIG. 11 illustrates schematically a system and means for implementing embodiments in accordance with the present teachings.

The communications system 90, e.g. 5G system, comprises a number of communication devices 10 and network nodes 11, 12. The communication device 10 may comprise any device for wireless communication, e.g. a smart phone, a cellular phone etc. The communications system 90 may comprise various types of network nodes, e.g. access points, such as for instance, eNodeBs, low-power radio base stations etc., core network nodes such as mobility management entities, gateways etc.

In FIG. 11, the communications system 90 is shown comprising a communication device 10 and network node 11, 12, in which methods according to the present teachings may be implemented. The communication device 10 and the network node 11, 12 each comprises a processor 70, 80 comprising any combination of one or more of a central processing unit (CPU), multiprocessor, microcontroller, digital signal processor (DSP), application specific integrated circuit etc. capable of executing software instructions stored in a memory 71, 81 which can thus be a computer program product 71, 81. The processor 70 of the communication device 10 can be configured to execute any of the various embodiments of the method 50 for instance as described in relation to FIG. 8 or 9. The processor 80 of the network node 11, 12 can be configured to execute any of the various embodiments of the method 60 for instance as described in relation to FIG. 10.

The memory 71, 81 can be any combination of read and write memory (RAM) and read only memory (ROM), Flash memory, magnetic tape, Compact Disc (CD)-ROM, digital versatile disc (DVD), Blu-ray disc etc. The memory 71, 81 may also comprise persistent storage, which, for example, can be any single one or combination of magnetic memory, optical memory, solid state memory or even remotely mounted memory.

Each of the communication device 10 and the network node 11, 12 comprises an input/output means 73, 83 for communication (indicated by Tx/Rx in FIG. 11), in particular for wireless communication. The input/output means 73 of the communication device 10 may, for instance, comprise antennas, transmission circuitry, receiving circuitry, interfaces, protocol stacks etc., and the communication device 10 is able to communicate wirelessly, e.g. over a radio interface, with the network nodes 11, 12, e.g. access points, using the input/output 73.

The input/output means 83 of the network node 11, 12 may, for instance, comprise antennas, transmission circuitry, receiving circuitry, interfaces, protocol stacks etc., and the network node 11, 12 is able to communicate with the communication device 10 using the input/output 83.

Each of the communication device 10 and the network node 11, 12 may comprise additional processing circuitry, schematically indicated at reference numerals 75, 85, respectively, for implementing the various embodiments according to the present teachings.

The communication device 10 may comprise beamforming means 74, by means of which it may point a transmission (TX) beam in a desired direction, e.g. a beam for the MRS request transmission. The beamforming means 74 may comprise processing circuitry for calculating beamforming configuration settings for such pointed transmission beams, e.g. based on reciprocity of received discovery signal beams.

The network node 11, 12 may comprise beamforming means 84 e.g. for providing device-specific beams. The beamforming means 84 may comprise processing circuitry for calculating beamforming configuration settings for such pointed transmission beams to communication devices 10. The network node 11, 12 may also comprise antenna control means 86, e.g. processing circuitry, for controlling antennas (not illustrated). The antenna control means 86 may provide (for instance in cooperation with the beamforming means 84) a radiation pattern controlled by transmitting a signal from a plurality of antenna elements of an antenna system 87 with element specific gain and phase. Radiation patterns with different pointing direction and beam widths may be created. The network node 11, 12 may transmit signals to the antenna system 87, which then performs the transmitting. Such antenna system 87 may, for instance, comprise a reconfigurable antenna system (RAS).

The present teachings also encompass a computer program 72 for a communication device 10 for triggering mobility reference signaling. The computer program 72 comprises computer program code, which, when executed on at least one processor on the communication device 10 causes the communication device 10 to perform the method 50 according to any of the described embodiments.

The present disclosure also encompasses computer program products 71 comprising a computer program 72 for implementing the embodiments of the method as described, and a computer readable means on which the computer program 72 is stored. The computer program product, or the memory, thus comprises instructions executable by the processor 70. Such instructions may be comprised in a computer program, or in one or more software modules or function modules. The computer program product 71 may, as mentioned earlier, be any combination of random access memory (RAM) or read only memory (ROM), Flash memory, magnetic tape, Compact Disc (CD)-ROM, digital versatile disc (DVD), Blu-ray disc etc.

A communication device 10 for triggering mobility reference signaling in a communications system 90 is provided. The communication device 10 is configured to:
determine a need for a handover, and
transmit, to at least one candidate access point 12, an indication to transmit a mobility reference signal, the mobility reference signal being used for performing measurements for handover.

The communication device 10 may be configured to perform the above steps e.g. by comprising one or more processors 70 and memory 71, the memory 71 containing instructions executable by the processor 70, whereby the communication device 10 is operative to perform the steps.

In an embodiment, the indication comprises a preamble sequence, the preamble sequence being selected from a set of preamble sequences.

In an embodiment, the set of preamble sequences comprises a subset of preamble sequences allocated for physical random access channel, PRACH.

In a variation of the above embodiment, the communication device 10 is configured to transmit the preamble sequence on a physical random access channel, PRACH.

In some embodiments, the communication device 10 is configured to:
determine an index corresponding to a subset of mobility reference signals to measure on,
transmit, to the candidate access point 12, the determined index, and
measure on the subset of mobility reference signals transmitted by the candidate access point 12.

In different embodiments, the set of preamble sequences comprises one of: random access sequences, uplink sounding reference signal sequences and uplink synchronization signal sequences.

In some embodiments, the communication device 10 is configured to transmit the indication in a beam directed towards the candidate access point 12.

In a variation of the above embodiment, the communication device 10 is configured to base beamforming of the beam on reciprocity of a beamformed discovery reference signal received from the candidate access point 12.

In various embodiments, the communication device 10 is configured to blindly transmit the indication in multiple directions.

In various embodiments, the communication device 10 is configured to determine a failure to receive the mobility reference signal and to repeat the transmitting of the indication using a higher power.

In various embodiments, the communication device 10 is configured to:
receive the mobility reference signal from the candidate access point 12,
determine a quality indicator of the mobility reference signal, and
determine, based on the quality indicator, whether to perform a handover.

The communication device 10 may be configured to receive mobility reference signals from several candidate access points, and the communication device 10 may then determine, based on respective quality indicators determined for each mobility reference signal, whether to perform a handover to the best candidate access point 12.

In various embodiments, the communication device 10 is configured to determine the need for a mobility reference signal based on quality of a radio link between the communication device 10 and the currently serving access point 11.

The present teachings also encompass a computer program 82 for a network node 11, 12 for mobility reference signaling. The computer program 82 comprises computer program code, which, when executed on at least one processor on the network node 11, 12 causes the network node 11, 12 to perform the method 60 according to any of the described embodiments.

The present disclosure also encompasses computer program products 81 comprising a computer program 82 for implementing the embodiments of the method as described, and a computer readable means on which the computer program 82 is stored. The computer program product, or the memory, thus comprises instructions executable by the processor 80. Such instructions may be comprised in a computer program, or in one or more software modules or function modules. The computer program product 81 may, as mentioned earlier, be any combination of random access memory (RAM) or read only memory (ROM), Flash memory, magnetic tape, Compact Disc (CD)-ROM, digital versatile disc (DVD), Blu-ray disc etc.

A network node 11, 12 for mobility reference signaling is provided. The network node 11, 12 is configured to:
transmit a discovery reference signal,
detect, in a transmission from a communication device 10, an indication to transmit a mobility reference signal, and transmit, in response to the detection, a mobility reference signal.

The network node 11, 12 may be configured to perform the above steps e.g. by comprising one or more processors 80 and memory 81, the memory 81 containing instructions executable by the processor 80, whereby the network node 11, 12 is operative to perform the steps.

In an embodiment, the indication comprises an index corresponding to a subset of mobility reference signals, and the network node 11, 12 is configured to, upon detecting the index, determine a subset of mobility reference signals corresponding to the detected index, and to transmit the determined subset of mobility reference signals.

In some embodiments, the network node 11, 12 is configured to transmit the mobility reference signal using user-specific beamforming.

Figure 12:
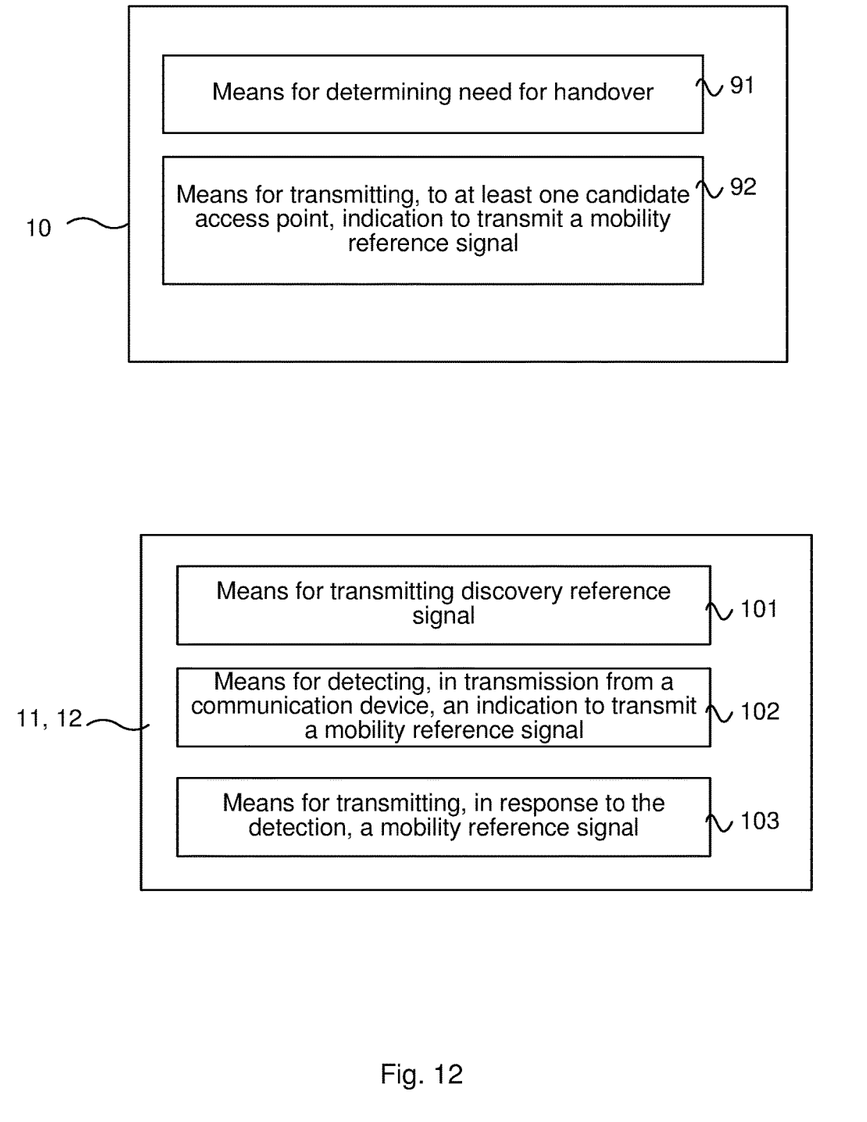
FIG. 12 illustrates a communication device and network node, each comprising function modules/software modules for implementing embodiments in accordance with the present teachings.

FIG. 12 illustrates a communication device and network node, each comprising function modules/software modules for implementing embodiments of the present invention. The means, e.g. function modules, e.g. function modules, can be implemented using software instructions such as computer program executing in a processor and/or using hardware, such as application specific integrated circuits (ASICs), field programmable gate arrays, discrete logical components etc., and any combination thereof. Processing circuitry may be provided, which may be adaptable and in particular adapted to perform any of the steps of the methods 50, 60 that have been described.

A communication device 10 for triggering mobility reference signaling in a communications system is provided. The communication device 10 comprises first means 91 for determining a need for a handover to a candidate access point. Such means may comprise processing circuitry adapted to perform such determining.

The communication device 10 comprises second means 92 for transmitting signals to an output device in order for it to transmit, to at least one candidate access point, an indication to transmit a mobility reference signal, the mobility reference signal being used for performing measurements for handover between a serving access point and the candidate access point.

The communication device 10 may comprise still further means for implementing the various embodiments of the method 50 that have been described.

A network node 11, 12 for mobility reference signaling is provided. The network node 11, 12 comprises first means 101 for transmitting signals to an antenna system in order for it to transmit a discovery reference signal. Such first means 101 may comprise antenna control means 86 and, in some embodiments also beamforming means 84, as described with reference to FIG. 11.

The network node 11, 12 comprises second means 102 for detecting, in a transmission from a communication device, an indication to transmit a mobility reference signal. Such second means 102 may comprise processing circuitry adapted to perform such detection.

The network node 11, 12 comprises third means 103 for transmitting, in response to the detection, a mobility reference signal. Such third means 103 may for instance comprise transmitting signals to an antenna system in order for it to transmit the mobility reference signal, as described with reference to FIG. 11.

The network node 11, 12 may comprise still further means for implementing the various embodiments of the method 60 that have been described.

The invention has mainly been described herein with reference to a few embodiments. However, as is appreciated by a person skilled in the art, other embodiments than the particular ones disclosed herein are equally possible within the scope of the invention, as defined by the appended patent claims.

The invention claimed is:

1. A method performed in a communication device for triggering mobility reference signaling in a communications system, wherein the communication system includes a serving access point and wherein the serving access point communicates with the communication device via one or more beams utilizing beamforming for directional communication, the method comprising:
   determining a need for a handover from the serving access point to another access point that utilizes beamforming for directional communication;
   transmitting, to at least one candidate access point, a signal that includes an indication to request the at least one candidate access point to transmit a mobility reference signal;
   receiving, from a candidate access point of the at least one candidate access point, the mobility reference signal on at least one beam of the candidate access point; and
   performing measurements based on the mobility reference signal to select a beam of the candidate access point as a target beam to perform the handover of the communication device.

2. The method as claimed in claim 1, wherein the indication comprises a preamble sequence selected from a set of preamble sequences.

3. The method as claimed in claim 2, wherein the set of preamble sequences comprises a subset of preamble sequences allocated for physical random access channel (PRACH).

4. The method as claimed in claim 2, comprising transmitting the preamble sequence on a physical random access channel (PRACH).

5. The method as claimed in claim 2, further comprising:
   determining an index corresponding to a subset of mobility refemnce signals to measure on,
   transmitting, to the at least one candidate access point, the determined index, and
   measuring on the subset of mobility reference signals transmitted by the candidate access point.

6. The method as claimed in claim 1, wherein the transmitting comprises transmitting the signal by beamforming in a beam directed towards the at least one candidate access point.

7. The method as claimed in claim 6, wherein beamforming of the beam is based on reciprocity of a beamformed discovery reference signal received from the at least one candidate access point.

8. The method as claimed in claim 1, wherein the transmitting comprises blindly transmitting the signal in multiple directions.

9. The method as claimed in claim 1, further comprising determining a failure to receive the mobility reference signal and repeating the transmitting of the signal using a higher power.

10. The method as claimed in claim 1, further comprising:
    receiving the mobility reference signal from the candidate access point,
    determining a quality indicator of the mobility reference signal, and
    determining, based on the quality indicator, whether to perform a handover.

11. The method as claimed in claim 1, wherein the determining a need for the handover is based on a quality of a radio link between the communication device and the serving access point.

12. A non-transitory computer readable storage medium having program code stored thereon, which, when executed on at least one processor of a communication device for triggering mobility reference signaling, wherein a serving access point communicates with the communication device via one or more beam, utilizing beamforming for directional communication, causes the communication device to perform operations comprising:
determining a need for a handover from the serving access point to another access point that utilizes beamforming for directional communication;
transmitting, to at least one candidate access point, a signal that includes an indication to request the at least one candidate access point to transmit a mobility reference signal;
receiving, from a candidate access point of the at least one candidate access point, the mobility reference signal on at least one beam of the candidate access point; and
performing measurements based on the mobility reference signal to select a beam of the candidate access point as a target beam to perform the handover of the communication device.

13. A communication device for triggering mobility reference signaling in a communications system, wherein the communication system includes a serving access point and wherein the serving access point communicates with the communication device via one or more beams utilizing beamforming for directional communication, the communication device comprising:
a processor; and
a memory, the memory containing instructions executable by the processor, in which the instructions, when executed on the processor, cause the communication device to perform operations to:
determine a need for a handover from the serving access point to another access point that utilizes beamforming for directional communication;
transmit, to at least one candidate access point, a signal that includes an indication to request the at least one candidate access point to transmit a mobility reference signal;
receive, from a candidate access point of the at least one candidate access point, the mobility reference signal on at least one beam of the candidate access point; and
perform measurements based on the mobility reference signal to select a beam of the candidate access point as a target beam to perform the handover of the communication device.

14. The communication device as claimed in claim 13, wherein the indication comprises a preamble sequence selected from a set of preamble sequences.

15. The communication device as claimed in claim 14, wherein the set of preamble sequences comprises a subset of preamble sequences allocated for physical random access channel (PRACH).

16. The communication device as claimed in claim 14, wherein the instructions, when executed on the processor, further cause the communication device to:
determine an index corresponding to a subset of mobility reference signals to measure on,
transmit, to the at least one candidate access point, the determined index, and
measure on the subset of mobility reference signals transmitted by the candidate access point.

17. The communication device as claimed in claim 14, wherein the set of preamble sequences comprises one of: random access sequences, uplink sounding reference signal sequences and uplink synchronization signal sequences.

18. The communication device as claimed in claim 13, wherein the instructions, when executed on the processor, further cause the communication device to transmit the signal by beamforming in a beam directed towards the at least one candidate access point.

19. The communication device as claimed in claim 18, wherein the instructions, when executed on the processor, further cause the communication device to base beamforming of the beam on reciprocity of a beamformed discovery reference signal received from the at least one candidate access point.

20. The communication device as claimed in claim 13, wherein the instructions, when executed on the processor, further cause the communication device to blindly transmit the signal multiple directions.

21. The communication device as claimed in claim 13, wherein the instructions, when executed on the processor, further cause the communication device to determine a failure to receive the mobility reference signal and to repeat the transmit of the signal using a higher power.

22. The communication device as claimed in claim 13, wherein the instructions, when executed on the processor, further cause the communication device to:
receive the mobility reference signal from the candidate access point,
determine a quality indicator of the mobility reference signal, and
determine, based on the quality indicator, whether to perform a handover.

23. A method performed in a network node for mobility reference signaling, wherein the network node includes an access point that utilizes beamforming for directional communication with one or more communication devices, the method comprising:
transmitting a discovery reference signal;
receiving a signal from a communication device in response to the discovery reference signal;
detecting, in the signal from the communication device, an indication to transmit a mobility reference signal; and
transmitting, in response to the detection of the indication in the signal, the mobility reference signal on at least one beam of the access point to the communication device, in order for the communication device to select a beam of the mobility reference signal as a target beam in handover of the communication device to the access point.

24. The method as claimed in claim 23, wherein the indication comprises an index corresponding to a subset of mobility reference signals, and the method further comprises, upon detecting the index, determining the subset of mobility reference signals corresponding to the detected index, and transmitting the determined subset of mobility reference signals.

25. The method as claimed in claim 23, wherein the transmitting the mobility reference signal comprises transmitting the mobility refemnce signal using user-specific beamforming.

26. A network node for mobility reference signaling, wherein the network node includes an access point that utilize beamforming for directional communication with one or more communication devices, the network node comprising:
- a processor; and
- a memory, the memory containing instructions executable by the processor, in which the instructions, when executed on the processor, cause the network node to perform operations to:
  - transmit a discovery reference signal;
  - receive a signal from a communication device in response to the discovery reference signal;
  - detect, in the signal from the communication device, an indication to transmit a mobility reference signal; and
  - transmit, in response to the detection of the indication in the signal, the mobility reference signal on at least one beam of the access point to the communication device, in order for the communication device to select a beam of the mobility reference signal as a target beam in handover of the communication device to the access point.

27. The network node as claimed in claim 26, wherein the indication comprises an index corresponding to a subset of mobility reference signals, wherein the instructions, when executed on the processor, further cause the network node to, upon detecting the index, determine the subset of mobility reference signals corresponding to the detected index, and to transmit the determined subset of mobility reference signals.

* * * * *